Nov. 1, 1966  E. A. J. MARCATILI  3,283,262
OPTICAL MASER OPERATING IN THE $TM_{0n}$ MODE
Filed May 1, 1963
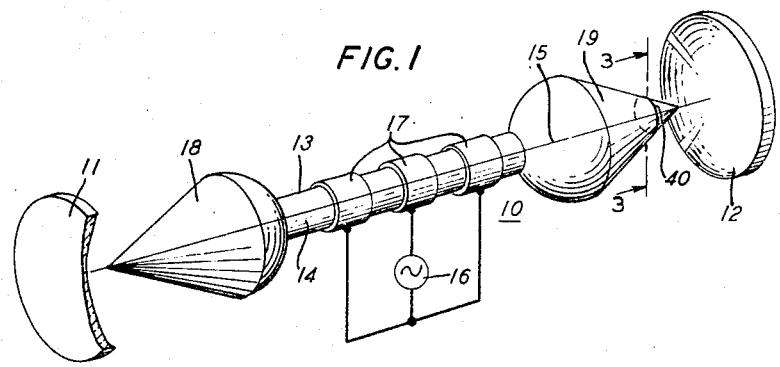
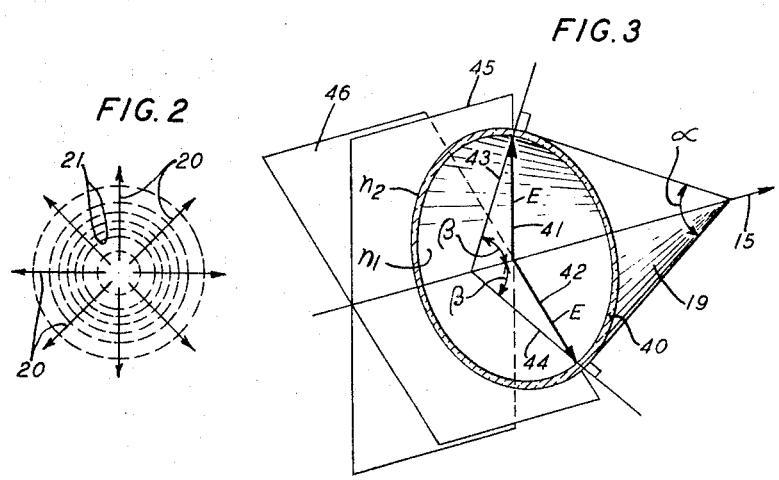
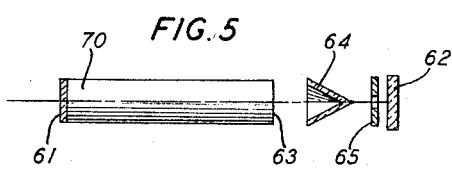
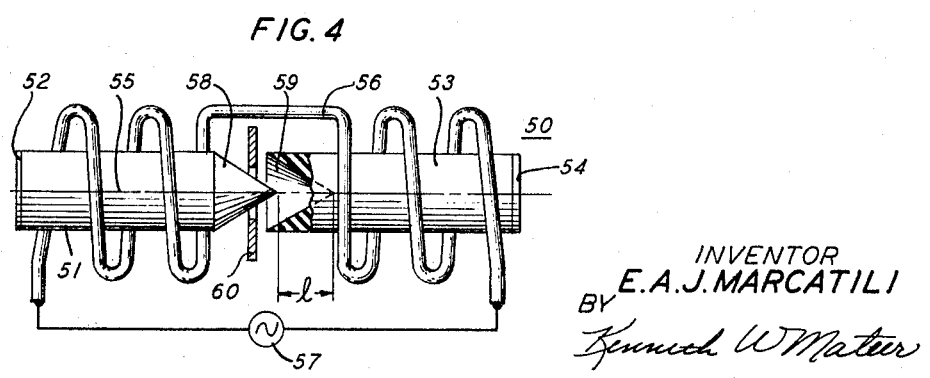
INVENTOR
E.A.J. MARCATILI
BY
Kenneth W. Mateer
ATTORNEY

United States Patent Office 3,283,262
Patented Nov. 1, 1966

3,283,262
OPTICAL MASER OPERATING IN THE
TM$_{0n}$ MODE
Enrique A. J. Marcatili, Fair Haven, N.J., assignor to Bell Telephone Laboratories, Incorporated, New York, N.Y., a corporation of New York
Filed May 1, 1963, Ser. No. 277,266
10 Claims. (Cl. 331—94.5)

This invention relates to optical masers and, more particularly, to optical maser arrangements in which the preferred modes of propagation comprise the circular magnetic mode family.

It is now well known that amplification of electromagnetic wave energy can be achieved by stimulated emission from media in which there is produced, at least intermittently, a population inversion in a characteristic energy level system. Such media are generally referred to as negative temperature, or maser, media, and the amplification process is termed maser action or simply "masing."

One method of improving the efficiency of the interaction between the wave to be amplified and the negative temperature medium involves resonating the wave in a cavity of appropriate dimensions which contains the medium. At the optical frequencies of interest, however, the wavelengths involved are too small to permit cavity dimensions to be of the order of one wavelength, the typical relationship at the lower microwave frequencies. Accordingly, cavities having dimensions which are many thousands of times larger than the wavelengths of the energy involved are employed.

Among the successfully employed optical maser cavity structures are plane parallel reflective surfaces separated by a convenient gap; concave spherical reflective surfaces spaced apart; and total internal reflection prisms also separated an appropriate distance. The reflectors are positioned with respect to each other and with respect to the negative temperature medium in a manner producing multiple light wave reflections therebetween, the reflected waves traveling through the amplifying medium on each passage between the reflectors. During each such passage, interaction with atomic or molecular resonators in the maser medium produces amplification. At the same time attenuation due to scattering in the medium, finite conductivity of the reflectors, diffraction at the reflectors, and reflections at each media interface occurs. The usefulness of the optical maser depends upon keeping the associated losses lower in magnitude than the magnitude of the available energy gain.

In the past, optical maser devices have generally been stimulated to emit optical radiation as multimode, albeit, phase coherent, time coherent, and substantially single frequency, electromagnetic wave energy. Since the energy was multimode, various optical relationships which were helpful in reducing beam losses could not be satisfied for the total wave power. Consequently, the efficiency of an operational maser was not as high as it might otherwise be.

It is an object of the present invention to increase the efficiency of optical maser arrangements.

It is a more specific object of the invention to use the masing material more uniformly to increase available power output.

A further object of this invention is to resonate an optical maser arrangement in a substantially single wave mode, thereby to provide a source of a single wave mode for use in optical communication systems.

In accordance with the invention, energy beam losses are reduced at media interfaces for a selected class of wave modes, the lower loss associated with the mode class creating a mode preference within the maser arrangement due to the higher attenuation of modes outside the selected class. Operation of the maser in a preferred mode results in a more uniform use of the masing material and an increased power output.

In order to effect a modal preference, a negative temperature medium interface having a Brewster angle relationship for solely the preferred modes is employed. In accordance with the invention, the preferred class of wave modes comprises the circular magnetic, or TM$_{0n}$ family, and the interface is a right conical surface having its apex on the optic axis of the optical maser cavity. The conical interface is oriented at the Brewster angle with respect to incident wave energy in the TM$_{0n}$ modes. For all modes other than circular magnetic, the Brewster angle condition is not satisfied over the entire area of incidence, thereby introducing reflection losses to waves in such other modes.

According to a first preferred embodiment of the invention, an optical maser comprises a gaseous negative temperature medium within an elongated optically transparent dielectric envelope having axially separated output windows in the form of hollow circular cones with the apex of each conical window on the medium axis and directed away from the interior of the medium. External reflectors are spaced apart on the axis beyond the output windows and are oriented iteratively to reflect wave energy therebetween. Irises can be employed in the spaces between the windows and reflectors to eliminate all but a desired one of the modes of the circular magnetic family.

According to a second preferred embodiment of the invention, an optical maser comprises a solid state negative temperature medium with at least one conical window portion positioned along the longitudinal axis of the medium. Reflecting surfaces are spaced apart along the axis of the negative temperature medium and at opposite extremities thereof to form a resonant cavity supportive of multiple energy reflections therebetween.

The above and other objects of the present invention, together with its various features and advantages can be more readily gained from the reference to the accompanying drawing and detailed description thereof which follows.

In the drawing:

FIG. 1 is a perspective view of a gaseous optical maser in accordance with the present invention;

FIG. 2, given for purposes of explanation, illustrates the field configuration for the TM$_{01}$ mode;

FIG. 3 is a perspective view of a portion of one conical output window of the maser of FIG. 1;

FIG. 4 is a plan view of a solid state optical maser in accordance with the invention; and FIG. 5 illustrates an alternative solid state maser embodiment.

Referring more particularly to FIG. 1 of the drawing, there is shown gaseous optical maser 10 comprising an interferometer cavity resonator formed by energy reflective surfaces 11, 12, at least one of which is advantageously partially transmissive to permit abstraction of energy therefrom. Reflectors 11, 12 each can comprise, for example, plane optical quality glass plates having a plurality of alternate layers of magnesium fluoride and zinc sulfide deposited on the surface thereof, concave spherical mirrors similarly coated, or total internal reflection prisms.

Disposed within the cavity formed by reflective end members 11, 12 is an elongated envelope 13 containing a gaseous negative temperature medium 14 having a typical length of 100 centimeters and having a central axis of propagation 15 between the end members. Negative temperature medium 14 is characterized by an appropriate energy level system for maser action which advantageously includes a pair of levels between which a metastable population inversion can be at least intermittently established, the return of this system to equilibrium being accompanied by the emission of electromagnetic wave energy in the optical frequency range. For example, a mixture of helium and neon gases can be used. In one typical mode of operation of the device, radio frequency pump energy from source 16 is applied to the gas mixture by electrodes 17, thereby causing an electrical discharge in the gas mixture within envelope 13. The energy from the internal discharge produces a metastable energy level population inversion in the gaseous medium which results in stimulated emission of radiation. The portion of the stimulated radiation propagating along axis 15 passes through output windows 18, 19 and is multiply reflected between reflectors 11, 12, the magnitude of each reflected portion increasing on successive traversals of the negative temperature medium.

The distribution of the energy across the cross section of the beam emitted by the negative temperature medium depends upon the transmission and loss characteristics of the cavity environment. In particular, the field distribution in planes normal to axis 15 of FIG. 1 for a mode of particular interest in the present invention is shown in FIG. 2. From conductively bounded wave guide principles, the illustrated mode can be seen to correspond to the $TM_{01}$, or circular magnetic mode in which the electric field distribution is indicated by radially directed solid lines 20 and in which the magnetic field distribution is indicated by dashed circles 21. When the $TM_{01}$ cavity mode is present, energy in the $TM_{01}$ mode propagating normally to mirror 12 in a direction parallel to axis 15 will be described by electric field loops lying in axial planes.

In accordance with the present invention, a conical interface is combined with an optical maser cavity arrangement to introduce a preference for, and to thereby make it possible to support, $TM_{01}$ mode propagation. In FIG. 1, the conical interface comprises output windows 18, 19, which can comprise a high quality optical glass of which Corning No. 7056 and Bausch & Lomb No. BSC-51 are typical examples. The relationship between the conical windows 18, 19 and the preferred propagation mode can best be gained from reference to FIG. 3, which is in the portion of window 19 in FIG. 1 between circle 40 and the apex of the cone. The portion of cone 19 illustrated in FIG. 3 is that portion typically illuminated by an optical beam generated within medium 14 and propagating between reflectors 11, 12. In FIG. 3, cone angle $\alpha$ is equal to $2(90-\beta)$ degrees where $\beta$ is the Brewster angle defined as $\tan^{-1} n_2/n_1$ in which $n_2$ is the refractive index of the dielectric material comprising the cone and $n_1$ is the refractive index of the negative temperature medium. When $\alpha$ is $2(90-\beta)$ degrees, $TM_{0n}$ losses are substantially reduced, while other modes experience varying losses. Specifically, if electric vectors 41, 42 are considered to be portions of a $TM_{01}$ mode propagating along and parallel to axis 15, each will be incident upon the interior surface of cone 19 in the plane of incidence defined for the particular location at which the electric vector and the conical surface intersect. The plane of incidence is defined as that plane containing both the normal to the surface at the point of incidence and the direction of power flow. In FIG. 3, axis 15 defines the direction of power flow and lines 43, 44 are the normals at the point of intersection of vectors 41, 42 respectively, with cone 19. Normal 43 and axis 15 define the plane of incidence 45 for vector 41 while normal 44 and axis 15 define the plane of incidence 46 for vector 42.

It is known that a wave incident upon a dielectric interface with an angle of incidence $\beta$ and with its electric vector in the plane of incidence will experience zero reflection if $\beta$ is the Brewster angle defined above. For waves propagating along axis 15, the angle of incidence appears between axis 15 and the surface normals of cone 19, of which normals 43, 44 are typical.

For a right circular cone with $\alpha=2(90-\beta)$ degrees, it can be shown that for energy propagating along axis 15 the angles of incidence are equal to each other and to $\beta$, the Brewster angle. Since vectors 41, 42 are radial, and since the planes of incidence for cone 19 are also radial, $TM_{01}$ wave mode configurations propagating along axis 15 will be incident on cone 19 with all electric vectors in their respective planes of incidence. Accordingly, the $TM_{01}$ mode will experience substantially no losses from reflection at the interior surface of cone 19. A similar result would obtain for higher order $TM_{0n}$ modes. However, no modes other than $TM_{0n}$ have electric field distributions which satisfy the Brewster angle condition and therefore all modes other than $TM_{0n}$ experience reflection losses at conical window 19. Thus the conical window configuration introduces a $TM_{0n}$ mode preference into the optical maser cavity environment due to the cumulation of the power losses introduced to all other modes upon each successive window traversal. Steady state operation of the maser of FIG. 1 would accordingly be in a $TM_{0n}$ wave mode. Irises of the proper size and configuration can be introduced between the conical window and its associated reflector to introduce losses to all $TM_{0n}$ modes but the $TM_{01}$ mode, for example.

For optical masers in accordance with the present invention, the area of each external mirror must be increased 10% over their size for $TEM_{00}$ mode propagation to maintain equal diffraction loss levels in the two cases. This requirement is essentially due to the distribution of fields at the mirrors, since energy in $TM_{0n}$ modes is spread more from the axis. However, because of a more uniform use of masing material resulting from the $TM_{0n}$ field distributions, the power output of an optical maser operating in the $TM_{01}$ mode is greater by approximately 5 decibels than the power output of prior art masers operating in the $TEM_{00}$ mode for the same maximum energy density in the masing material. That is, whereas in prior art TEM mode maser arrangements, energy was concentrated at the center of the masing material upon successive traversals of the cavity, the $TM_{0n}$ mode energy distribution has a maximum intensity at a point spaced from the center. The high intensity portion is thus less concentrated, and the beam can physically interact with more active volume of the maser material. Thus optical masers in accordance with the invention are more efficient.

The description above has been restricted to masers of the gaseous type. FIG. 5 illustrates a partially broken away plan view of a solid state maser embodiment of the invention.

In FIG. 4, optical maser 50 comprises an elongated rod of negative temperature material such as ruby or neodymium-doped calcium tungstate, for example. The solid medium comprises a first portion 51 having a reflecting end portion 52 and a second portion 53, having a reflecting end portion 54. Portions 51, 53 are disposed collinearly along maser axis 55 and are surrounded by flash lamp 56, which can be either intermittently or continuously energized by source 57. Thus the optical maser of FIG. 5 has equal application to both pulsed and continuously operating arrangements. In accordance with the present invention, the adjacent interior end portions have conical surfaces 58, 59 which are mating. That is, surface 58 is a convex right circular cone having its apex extending to the right on axis 55 while surface 59 is a concave right circular cone also having its apex extending to the right on axis 55. Surfaces 58, 59 are spaced apart a distance $l$ between their apexes, $l$ being greater than one-eighth wavelength of the energy involved. Thus the separation provides an effective dielectric interface which stimulated radiation must cross on each reflection between end plates 52, 54. The effect of the interface, when the conical surfaces are proportioned to have cone angles equal to $2(90-\beta)$ degrees where $\beta$ is the Brewster angle for the materials involved, is to introduce reflection losses to all wave mode configurations other than $TM_{0n}$ as explained with reference to FIGS. 1 through 3. Accordingly, after multiple passes between reflectors 52, 54, the energy is substantially pure $TM_{0n}$. Since at least one of the reflectors is advantageously partially transmissive, a portion of the stimulated energy passes therethrough and is available for utilization externally of the maser cavity.

In FIG. 4, iris 60 is shown positioned transverse to axis 55, in the air space between conical surfaces 58, 59. The iris, which can comprise a thin metallic plate with a central aperture on axis 55, serves to filter out all modes of higher order than $TM_{01}$.

An alternative solid state $TM_{01}$ maser arrangement is shown in FIG. 5, in which a rod 70 of negative temperature material is placed within a cavity comprising silvered rod end portion 61 and external mirror 62. Between rod end 63 and mirror 62 is conical window 64 in accordance with the invention. Iris 65 introduces loss to higher order $TM_{0n}$ modes, resulting in $TM_{01}$ maser mode generation. Rod 70 is stimulated by means not illustrated, and at least one of mirrors, 61, 62 is partially transmissive to permit energy abstraction.

In all cases, it is understood that the above-described embodiments are illustrative of the principles of the present invention. Numerous and varied other embodiments could be devised in accordance with these principles by those skilled in the art without departing from the spirit and scope of the invention.

What is claimed is:

1. An optical maser comprising first and second spaced reflectors for electromagnetic wave energy,
   an elongated negative temperature medium disposed between said reflectors on the axis of energy reflected therebetween,
   means for stimulating the emission of radiation within said medium,
   said medium having at least one dielectric interface between the negative temperature medium and an adjacent dielectric having an index of refraction $n$ in the shape of a right circular cone with the apex of said cone positioned on said axis,
   said conical interface having a cone angle equal to $2(90-\beta)$ degrees where $\beta$ is the angle whose tangent is equal to $n$.

2. The maser according to claim 1 in which said negative temperature medium is a gas mixture in a discharge tube and said interface is formed by conical output windows.

3. The maser according to claim 1 in which said negative temperature medium comprises solid material and said interface is formed by a separation of said material into two portions spaced apart along said axis.

4. The maser according to claim 1 in which said negative temperature medium comprises solid material and said interface is formed by a hollow conical dielectric window disposed between said medium and said reflectors.

5. An optical maser comprising an elongated negative temperature medium characterized by a principal axis,
   means for applying pump energy to said medium for establishing a population inversion therein,
   an elongated optical interferometer resonant cavity comprising first and second external reflective end members,
   said negative temperature medium being disposed within said cavity and positioned with said axis substantially normal to said end members,
   and means for introducing a preference for $TM_{0n}$ wave mode propagation into said maser,
   said means comprising a right conical interface between said negative temperature medium and an adjacent dielectric, said interface having its apex on said axis and having a cone angle equal to $2(90-\beta)$ degrees where $\beta$ is the Brewster angle.

6. The maser according to claim 4 in which said negative temperature medium is a gas within a discharge tube and said interface is formed by conical output windows.

7. The maser according to claim 4 in which said negative temperature medium is a solid material comprising first and second portions spaced apart along said axis and said interface is formed at the adjacent surfaces of said solid material.

8. The maser according to claim 4 in which said negative temperature medium is a solid material and said interface comprises a hollow dielectric cone interposed within said cavity.

9. A source of optical frequency electromagnetic wave energy in a $TM_{0n}$ wave mode comprising a gaseous negative temperature medium having a central axis disposed between external reflecting surfaces which are positioned on said axis and normal thereto,
   and optically transparent output windows in the form of right circular cones centered on said axis at the axial extremities of said medium,
   said conical windows having a cone half angle equal to $(90-\beta)$ degrees where $\beta$ is the Brewster angle of incidence of energy propagating parallel to said axis.

10. A source of optical frequency electromagnetic wave energy in a $TM_{0n}$ wave mode comprising an elongated solid negative temperature medium having a central axis,
    and first and second external reflecting surfaces positioned on said axis and normal thereto,
    said medium being disposed between said surfaces, and a dielectric interface in the shape of a cone of half angle $(90-\beta)$ degrees interposed between said surfaces were $\beta$ is the associated Brewster angle.

No references cited.

JEWELL H. PEDERSEN, *Primary Examiner.*

EDWARD S. BAUER, *Assistant Examiner.*